United States Patent Office 3,417,161
Patented Dec. 17, 1968

3,417,161
COATING COMPOSITION OF A CARBOXYLIC ACID AMIDE POLYMER AND A CONDENSATE OF AN ORGONOPOLYSILOXANE AND AN ORGANOALKOXYSILANE
Robert G. Douds, Lower Burrell, and John Ostrowski, Pittsburgh, Pa., assignors to PPG Industries, Inc., a corporation of Pennsylvania
No Drawing. Filed Apr. 4, 1966, Ser. No. 539,667
11 Claims. (Cl. 260—825)

ABSTRACT OF THE DISCLOSURE

An improvement of a composition of an interpolymer of a polymerizable unsaturated carboxylic acid amide monomer, an organopolysiloxane resin, and at least one other polymerizable unsaturated monomer comprises using as the organopolysiloxane resin a condensate formed by reaction of an organoalkoxysilane and an organopolysiloxane. The resin may be used as a coating composition.

---

This invention relates to novel resinous materials and to the methods of preparation thereof, and pertains more particularly to coating compositions in which the vehicle comprises an interpolymer of a polymerizable unsaturated carboxylic acid amide monomer, an organoalkoxysilane condensate, and at least one other polymerizable unsaturated monomer, the condensate being formed by reaction of an organoalkoxysilane and an organopolysiloxane.

Coating compositions in which the vehicle comprises an unsaturated carboxylic acid amide interpolymer and an organosiloxane such as those disclosed in copending application Ser. No. 479,329, filed Aug. 12, 1965, now Patent No. 3,261,881, have been shown to have excellent properties. They are easily baked into excellent films with good chemical and solvent resistance and a high degree of flexibility, toughness, and adhesion. In addition, when used in pigmented, thermosetting enamels, they display excellent resistance to chalking and improved resistance to heat as compared to other coating compositions.

A completely homogeneous system of the above organopolysiloxane and amide interpolymer is usually not attainable. This lack of compatibility is believed to be a result of their substantially different chemical and physical properties. In most coating compositions the problem is minimal and the components can be readily cold-blended to provide the excellent coatings described above. In certain combinations, however, the amide interpolymer and siloxane are not as easily combined. This disadvantage appears to be primarily dependent upon the type of monomers utilized in forming the amide interpolymer. For example, when acrylonitrile is employed as a monomer it is found that the combination is obtained only with great difficulty.

It has now been discovered that by first condensing the above siloxane with a polymerizable organoalkoxysilane and subsequently incorporating this condensate within the above amide interpolymer a completely homogeneous system can be obtained for a wide variety of different amide interpolymers and siloxanes. Moreover, coatings prepared from the comopsitions of this invention retain substantially all of the excellent properties of the organopolysiloxane-containing coatings described above and even exhibit improvement in certain areas.

The chemical nature of this invention is not definitely known but it is believed that the organoalkoxysilane compounds are fairly uniformly attached to the siloxane polymers by means of a condensation reaction. Upon addition of monomeric materials and initiation of polymerization, the organoalkoxysilane condensate is interpolymerized with the other monomer or monomers, thereby linking together the amide and siloxane polymers. Thus, a completely homogeneous system is assured.

A significant improvement is in the durability of the coatings, which is especially important in any coating used as a finish exposed to weathering. Coatings made from the organopolysiloxane-containing compositions known heretofore possess adequate durability for many purposes, but finishes made from the compositions of this invention are even more durable and retain the outstanding flexibility, adhesion, toughness and other coating attributes characteristic of the first coating composition. Thus, these coatings are extraordinarily well-suited for use as exterior finishes on metal surfaces.

Another desirable quality obtained is high gloss of the resultant coating. This improvement, in turn, is probably at least partially due to increased water resistance ability. It is found, for example, that films made from compositions of this invention suffer negligibly from water spotting which appears in the conventional coatings in amounts significant enough to apparently decrease their gloss retention.

Also, whereas a combination of organopolysiloxane and amide interpolymer, as in the conventional coatings, usually results in an impairment of fabrication ability, the opposite effect is found in coatings made from compositions of this invention. It is found that coating flexibility is increased while embrittlement, as mentioned above, is decreased. Softening of the film, as indicated by hardness tests, is also significantly resisted.

Because the coatings of this invention retain substantially all of the desirable properties of the above organopolysiloxane-containing composition, they can be used as non-weathering type finishes, such as coatings for air conditioners and vending machines as well as in other applications where their overall excellence is required.

The interpolymers herein contain the unsaturated carboxylic acid amide, the organoalkoxysilane condensate, and usually at least one other ethylenically unsaturated monomer. Preferably, the amide groups are modified by reaction with an aldehyde and at least some of the aldehyde groups are etherified by reaction with an alcohol. Such modification is usually obtained by polymerizing the monomers and reacting the initial product of the polymerization with an aldehyde in the presence of excess butanol under acidic conditions. This results in the addition of the aldehyde to the amide and, under azeotropic conditions, condensation to form butoxymethyl amide substituents on the polymer backbone. Alternatively, the aldehyde-modified interpolymers are produced by interpolymerizing an aldehyde-modified amide, such as an alkylol amide, which may then be etherified. Another method is to interpolymerize an N-alkoxyalkyl amide with the organoalkoxysilane monomer which has been precondensed with an organopolysiloxane resin and any other monomer or monomers, or to include all the reactants in the reaction mixture and carry out the polymerization, alkylolation and etherification reactions simultaneously or sequentially in the same medium.

Methods for producing N-alkoxyalkyl-substituted unsaturated carboxylic acid amides such as N-butoxymethyl acrylamide, which amides are quite useful to produce the amide interpolymers employed herein, are disclosed in U.S. Patents Nos. 3,079,434 and 3,087,965.

After etherification, the amide interpolymer contains amido groups having a hydrogen atom replaced by the structure:

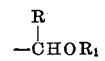

where R is hydrogen when the aldehyde employed is formaldehyde and an alkyl radical when other aliphatic aldehydes are used. $R_1$ is the radical derived by removing a hydroxyl group from the etherifying alcohol, i.e., an organic radical. $R_1$ in the etherified groups can be, for example, alkyl or aryl, and in the unetherified groups is hydrogen. The terms "alkyl" and "aryl," as employed herein, are to be construed broadly; the groups represented by $R_1$ may include other substituents and functional groups which do not affect the properties of the product. Thus, $R_1$ may include unsaturated linkages, ether linkages, halogens and other substituents, or it may be cyclic.

Satisfactory products may in some instances be obtained with none or only a very small part of the aldehyde-modified amide groups having been etherified, in some instances 5 percent or less. However, it is usually desirable that at least about 50 percent of these groups be etherified, since many compositions having less than about 50 percent of the groups etherified have a tendency to be somewhat less stable and subject to gelation.

Butanol is a preferred alcohol for use in the etherification, although any monohydric alcohol such as methanol, ethanol, propanol, pentanol, octanol, decanol and other alkanols containing up to about 20 or more carbon atoms may also be employed, as may aromatic alcohols, such as benzyl alcohol; or cyclic alcohols, such as cyclohexanol; or the monethers of glycols, such as ethylene glycol monobutyl ether, diethylene glycol monobutyl ether, and other monoethers of ethylene glycol, diethylene glycol, and the like, and their derivatives, and similar alcohols; or substituted alcohols, such as c-chloropropanol.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives, such as N-carbamyl maleimide, may also be utilized.

At least one organoalkoxysilane must be condensed with an organopolysiloxane and subsequently interpolymerized with the unsaturated carboxylic acid amide and the other monomer or monomers in forming the compositions of this invention. The organoalkoxysilane employed in this invention conforms to the general formula:

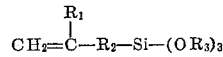

where $R_1$ is hydrogen or an alkyl radical; here $R_2$ is a divalent organic radical; and where $R_3$ is an alkyl radical.

The groups represented by $R_1$ include hydrogen and alkyl radicals of about 1 to about 6 carbon atoms, such as methyl, ethyl or propyl radicals.

$R_2$ is any divalent organic radical linking together the vinyl group, $CH_2=CR_1—$, and the alkoxysilane group, $—Si-(OR_3)_3$, and generally has between 1 and 7 carbon atoms. A prefered radical is a carbonyloxy-containing radical as represented by the formula:

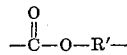

where $R'$ is an alkylene radical of 1 to 6 carbon atoms such as methylene, ethylene or propylene.

$R_2$ may also be a carbonyloxy radical,

or an alkylene radical of up to about 7 carbon atoms, such as methylene, ethylene or propylene.

$R_3$ includes alkyl radicals of about 1 to 6 carbon atoms such as methyl, propyl or butyl radicals.

Prefered organoalkoxy silanes are those in which $R_2$ is a carbonyloxy-containing radical such as in alpha-methacroyloxypropyltrimethoxysilane, alpha-acryloxypropyltrimethoxysilane and alpha-methacryloxyethyltrimethoxysilane.

The organopolysiloxanes which are condensed with the organoalkoxysilanes described above are well-known in the art, and those which are employed in this invention conform to the general unit formula:

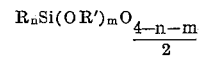

where R is a monovalent organic radical bonded to silicon by a carbon-to-silicon bond and R' is hydrogen, an alkyl radical, an aryl radical, or an acyl radical. The value of $n$ in the above formula is between about 0.5 and 1.9 and the value of $m$ between 0.01 and 2.5; the value of $m$ plus $n$ must be between 0.51 and 3.

The substituents represented by R in the above formula include, for example, monovalent hydrocarbon radicals such as methyl, ethyl, propyl, hexyl, octadecyl and similar alkyl radicals; monovalent cycloaliphatic radicals such as cyclohexyl, cyclobutyl, cyclopentyl; aryl radicals including alkaryl and aralkyl, for example, phenyl, methylphenyl, benzyl, phenylethyl and the like; alkenyl, for instance, vinyl, allyl, 3-butenyl, oleyl and linoleyl; cycloalkenyl radicals, such as cyclopentadienyl and 2-cyclobutenyl; as well as alkenylaryl groups such as the vinylphenyl radical. R may also be a substituted hydrocarbon radical, for example, a halo-substituted radical such as pentachlorophenyl, 1-bromo-3-trichloropropyl and perfluoroalkyl radicals, e.g., gamma-trifluoropropyl, delta-trifluoro-gamma-difluorobutyl, or it may be an amino-substituted hydrocarbon group such as aminomethyl, 3-aminopropyl, 4-aminobutyl, and the like. Other substituted hydrocarbon radicals which may be included within the scope of the R substituent are cyanosubstituted hydrocarbon radicals such as 3-cyanopropyl, carboxyl-substituted radicals such as 3-carboxylpropyl, and sulfur-substituted radicals, including 3-mercapto propyl, ethyl thioethyl, ethyl dithiopropyl, ethyl sulfinylpropyl, ethyl sulfonylpropyl, as well as hydroxy-substituted radicals, such as hydroxypropyl or hydroxybutyl.

The groups represented by R' include hydrogen, in which case the OR' group is a hydroxyl radical, and alkyl groups of 1 to 20 carbon atoms, such as methyl, ethyl, propyl, butyl, amyl, hexyl, heptyl and octyl. R' may also be an aryl radical such as phenyl, tolyl or halogen or other substituted phenyl, or an acyl radical such as acetyl, propionyl, butyryl or other similar acyl radicals, generally having between 1 and 8 carbon atoms.

The organosiloxanes for use in this invention are produced by conventional methods; often an organoalkoxysiloxane is partially hydrolyzed, thus replacing some of the alkoxy substituents with hydroxy groups, and the hydrolyzate is condensed to produce the desired siloxane resin. There may remain residual OH groups if the hydrolyzate is not completely condensed. The organosiloxane may also be produced using an organosilicon halide as the intermediate. Such methods are well known and the usefulness of organosiloxanes of the above formula in the coating compositions of this invention does not depend upon the method by which they are produced.

Examples of organosiloxanes and methods of producing them can be found in various publications as well as in patents such as U.S. Patents 2,258,218, 2,258,219, 2,258,-222, 2,371,050, 2,389,477, 2,584,341, 2,663,694, 2,746,-942, 2,768,149, and 3,015,637.

The preferred organosiloxanes are those now commercially available which usually contain phenyl and/or methyl substitution, such as, for example, those represented by the empirical formulas:

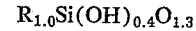

and

where R is defined as above.

The organoalkoxysilane is condensed with the above organopolysiloxane, utilizing from about 2 to about 20 percent of organoalkoxysilane, the balance being the organopolysiloxane.

The conditions at which the condensation reaction is carried out are ordinarily not critical and are chosen with reference to the particular reactants, reaction medium and desired extent of reaction. The mixture of organoalkoxysilane and organopolysiloxane and preferably a suitable solvent such as xylene, toluene or other similarly inert solvent, can be heated over a wide temperature range, depending primarily upon the boiling point of the solvent, for a time sufficient to provide the desired reaction. Generally, the temperature is between about 50° C. and about 200° C.

In the preferred embodiment of the invention, at least one other unsaturated monomer is interpolymerized with the unsaturated carboxylic acid amide and the organoalkoxysilane condensate; any polymerizable ethylenically unsaturated monomer can be so utilized. Such monomers include monoolefinic and diolefinic hydocarbons, as, for example, styrene and alpha-methyl styrene, halogenated monoolefinic and diolefinic hydrocarbons as, for example, alpha-chlorostyrene, alpha-bromostyrene, chloroethylene, butadiene and chloroprene; unsaturated esters of organic and inorganic acids, as for example, vinyl acetate, vinyl propionate, and vinyl butyrate, and methyl acrylate; nitriles, as, for example, acrylonitrile and methacrylonitrile; acid monomers as, for example acrylic acid, methacrylic acid and tiglic acid. Other examples of such monomers which can be utilized in the instant invention are given in U.S. Patent 3,037,963.

In general, it is preferred that the above monomer utilized contain a single $CH_2=C<$ group in the terminal position, which group is activated by a negative substituent and an especially preferred group of monomers incudes ethyl acrylate, methyl methacrylate, butyl acrylate, ethylhexyl acrylate, styrene, vinyl toluene, monomethyl styrene and acrylonitrile.

Preferably, the amide interpolymer should contain from about 2 percent to about 25 percent of the unsaturated carboxylic acid amide monomer and from about 5 percent to about 50 percent of the organo alkoxysilane condensate with the balance being the other polymerizable monomers. In carrying out the polymerization reaction, a catalyst is ordinarily utilized, which can be a peroxygen compound such as cumene hydroperoxide, lauroyl peroxide, benzoyl peroxide, or a similar compound. Azo compounds, such as alpha,alpha'-azo bisisobutyronitrile, may also be used, as may redox catalyst systems. In many instances it is desirable to add a chain-modifying agent, such as mercaptan, to the polymerization mixture.

The polymerization to produce the amide interpolymer is typically carried out by admixing the amide, the organoalkoxysilane condensate, the other monomer or monomers, and the catalyst and chain-modifying agent, if any, in the solvent, and refluxing the resulting solution for a time sufficient to obtain the desired conversion. Ordinarly, the polymerization will be complete in about 1 to 16 hours. It is often desirable to add the catalyst in increments as the polymerization progresses, and good agitation and careful temperature control are also desirable because of the very rapid reaction rate and because the reaction is highly exothermic.

When necesary to produce the desired structures the carboxylic acid amide is reacted with an aldehyde, preferably in the presence of an alcohol. Formaldehyde, in solution in water (Formalin) or in an alkanol such as butanol, or a formaldehyde-yielding substance such as paraformaldehyde, trioxymethylene or hexamethylenetetramine is preferred, but other aldehydes, including acetaldehyde, butyraldehyde, and the like, can be used. It is ordinarily preferred to utilize about two equivalents of aldehyde for each amide group present in the interpolymer, although this ratio may be raised or lowered considerably if desired.

To produce the preferred aldehyde-modified and etherified products, the reaction is usually carried out by reflexing the aldehyde, alcohol and interpolymer in the presence of a mild acid catalyst, such as maleic anhydride. Other acid catalysts, such as oxalic acid, hydrochloric acid or sulphric acid, may also be employed, although there is some possibility of gelation occurring if the acid catalyst is too strongly acidic. The quantity of catalyst utilized may be varied greatly; the more acidic the reaction medium, the greater the amount of etherification which will occur.

As noted above, similar polymeric materials may also be obtained by polymerizing a modified amide, such as an N-alklolamide or an N-alkoxyalkyl amide. The polymerization utilizing an N-alkylolamide or an N-alkoxyalkyl amide is caried out in substantially the same manner as when the unmodified amide is interpolymerized.

In addition to the essential components described, there may be included in the coating composition other materials such as the saturated or unsaturated oil-modified or non-oil-modified alkyd resins utilized in the coatings field, which may be produced from any polybasic acid and polyfunctional alcohol; also expoxide resins such as polyglcidyl ethers of polyhydric compounds, expoxidized polyolefins, and expoxidized aromatic compounds. The composition may also include, for example, phenol-formaldehyde condensation products or other phenolic resins; amine-aldehyde resins, such as formaldehyde condensates of melamine or urea; nitrocellulose; and similar materials. Additives which are conventionally used in the coating art, for example, plasticizers, anti-foaming agents, anti-skinning agents, and similar products, can also be included in the vehicle or coating composition if so desired.

When other materials, such as the resins described above, are employed in the coating composition, it is found that the best results are obtained when the amount of such other materials is less than 50 percent by weight of the resulting composition. As little as 2 percent by weight of the other materials may be used.

The composition described can be used as such to make clear films, but usually are used as a vehicle in compositions in which there is incorporated a pigment composition. Any conventional pigment can be used; the pigment composition may include, for example, titanium dioxide, carbon black, talc, barytes, zinc sulfate, strontium chromate, barium chromate, ferric iron oxide, silica, and other such pigments, as well as color pigments such a cadmium yellow, cadmium red, phthalocyanine blue, chromic yellow, tlouidine red, hydrated iron oxide and the like. The enamels or coating compositions are produced by blending the vehicle and a pigment composition in accordance with well-known practice.

In ordinary usage of the coating compositions of this invention, they are applied to the article to be coated, for example, by spraying or by similar conventional techniques and the baked to form a hard, adherent film. Typical baking schedules include 300° F. for 30 minutes to 500 °F. for 1 minute.

There are set forth below several examples which illustrate the nature and properties of the coating compositions of the invention. However, the invention should not be considered as being limited to their details. All parts and percentages are by weight and are based on total solids content, unless otherwise specified.

EXAMPLE 1

In preparing an organoalkoysilane condensate, a reaction vessel was charged with the following:

| | Parts by weight |
|---|---|
| Alpha-methacryloxyproyl-trimethoxysilane | 16.0 |
| Organopolysiloxane | 314.0 |
| Xylene | 78.0 |

The organopolysiloxane employed above had the following properties:

| | |
|---|---|
| Total solids (percent) | 98.0 |
| Hydroxyl content (percent) | 3.9 |
| Average molecular weight | 1600 |
| Refractive index | 1.531–1.539 |

This mixture was then condensed by refluxing while azeotropically removing water at a temperature of 130° C. for 30 minutes, after which the following materials were added:

| | Parts by weight |
|---|---|
| Acrylamide | 100.0 |
| Methacrylic acid | 25.0 |
| Acrylonitrile | 200.0 |
| Styrene | 250.0 |
| Butyl acrylate | 425.0 |
| Butanol | 405.0 |
| Xylene | 327.0 |
| Tertiary dodecyl mercaptan | 27.5 |
| t-Butylperoxy isopropylcarbonate (in 20 parts high boiling hydrocarbon aromatic solvent, boiling point 187° C.–205– C.) | 2.5 |

This mixture was refluxed at temperatures of 90–100° C. for 4 hours and an additional 0.64 part of catalyst was added. Refluxing was continued for another 2 hours after which 210 parts of a 40 percent solution of formaldehyde in butanol, 2.67 parts of maleic anhydride, 0.64 part of catalyst and 265 parts of high-boiling aromatic hydrocarbon solvent were added. Azeotrope was then conducted for 7 hours, with additional 0.64 part of catalyst being added after each one-hour interval, except for the last two. After cooling, 40.5 parts of xylene and 121.5 parts of butanol was added and the mixture was distilled at 106° C. for about an hour, with a loss of 162 parts of distillate. Next, 0.32 part of catalyst was added and the mixture refluxed for 2 hours. The resulting product had a percent solids content of 48.9, viscosity of V–W, acid number of 6.76, and color of 4+.

Another composition was similarly prepared except that the 16 parts of alpha-methacryloxypropyltrimethoxysilane used above was omitted and an additional 16 parts of organopolysiloxane was employed as a substitute.

Each of the two compositions was then thinned to a solids content of 30 percent, spread over a glass plate by means of a 3-mil drawdown bar and baked for about 2 minutes at 500° F. in order to determine compatibility. A compatible system was found to exist with the composition of this invention, whereas the other composition produced an incompatible system.

EXAMPLE 2

An organoalkoxysiloxane condensate was prepared as in Example 1, utilizing the same organoalkoxysilane but substituting for the siloxane another intermediate type phenyl-substituted siloxane having ethoxy side groups. The same proportion as in Example 1 was employed, that is, 314 parts of siloxane and 16 parts of the organoalkoxysilane. Typical properties of the siloxane are:

| | |
|---|---|
| Solids (percent) | 41.5 |
| Specific gravity | 90.0 |
| Viscosity | 4.7 |
| OH-free | 0.55 |
| OH-condensed | 2.75 |
| Acid number | 3.1 |
| Equivalent weight | 600 |

In preparing a vehicle of this invention, the following monomers and solvents, in addition to the above condensate, were used:

| | Parts by weight |
|---|---|
| Acrylamide | 100 |
| Methacrylic acid | 25 |
| Acrylonitrile | 200 |
| Ethyl acrylate | 425 |
| Methyl methacrylate | 250 |
| Butanol | 290 |
| Xylene | 290 |
| High-boiling aromatic solvent (Boiling point 185° C.–200° C.) | 315 |
| Diacetone alcohol | 290 |

The resulting product had a total solids content of 38.8 a viscosity of M⁻, an acid value of 7.32, and a color value of 4–5. The compatibility of this system was found to be excellent and coatings prepared therefrom exhibited excellent durability and gloss.

EXAMPLE 3

A vehicle was prepared as in Example 1, employing the the same organoalkoxysilane condensate, with the following monomers:

| | Parts by weight |
|---|---|
| Acrylamide | 50 |
| Methacrylic acid | 25 |
| Acrylonitrile | 200 |
| Ethyl acrylate | 725 |
| Butanol | 333 |
| Xylene | 333 |
| High-boiling aromatic solvent (Boiling point 185° C.–200° C.) | 334 |

The total resin solids content was 49.2, the viscosity W to X, acid value 7.26 and color value 4+. This system was found to be highly compatible and coatings prepared therefrom had excellent properties of durability, flexibility, hardness and gloss.

EXAMPLE 4

A vehicle of this invention (vehicle A), as prepared in Example 1, was employed to produce a coating composition in which a pigment, titanium dioxide, was dispersed in the mixture by means of a pebble mill in a pigment-to-binder ratio of 0.79/1. The percent organoalkoxysilane condensate utilized in preparing the composition was 20 percent, based on total solids, and the monomers used in forming the amide interpolymer were:

| | Parts by weight |
|---|---|
| Acrylonitrile | 200 |
| Acrylamide | 100 |
| Styrene | 250 |
| Methacrylic acid | 25 |
| Condensate (as in Example 1) | 50 |

Another vehicle (vehicle B) was similarly prepared except that the organoalkoxysilane was omitted and an equivalent additional amount of organopolysiloxane was employed as a substitute. Compatibility tests were then conducted by drawing the compositions down on glass by means of a 3-mil drawdown bar. Compatibility was visually determined by the amount of cloudiness or haziness of the compositions, both before and after baking. The results follow:

| Composition | Before bake | Baked film |
|---|---|---|
| Containing Vehicle A | Clear | Clear |
| Containing Vehicle B | Clear | Cloudy |

EXAMPLE 5

A vehicle was produced as in Example 1 substituting dimethyltriphenyltrimethoxytrisiloxane for the siloxane used therein. Coatings prepared therefrom exhibited excellent properties of durability, flexibility and gloss.

Similar results are obtained with various other siloxanes of the class described, such as, for example, the additive type organopolysiloxane comprising mono and di-substituted siloxane units and phenyl siloxane units (Dow-Corning DC-840), having the following properties:

Resin solids (percent) _____ 60
Specific gravity at 25° C. _____ 1.06
Viscosity (at 25° C.—centipoises) _____ 15–16

Other siloxanes that can be employed are, for example, low molecular weight, phenyl-substituted siloxanes (known commercially as Dow-Corning XR-830), as well as other compositions employing other organopolysiloxanes and amide interpolymers of the several types disclosed.

Other organoalkoxysilanes available for forming the organoalkoxysilane condensate of this invention are alpha-acryloxypropyltrimethoxysilane, alpha-methacryloxyethyl-trimethoxysilane and alpha-methacryloxybutyltrimethoxysilane.

According to the provisions of the patent statutes, there are disclosed above the invention and what are now considered to be its best embodiments. However, it is to be understood that, within the scope of the appended claims, the invention may be practiced otherwise than as specifically described.

We claim:

1. An interpolymer of a polymerizable unsaturated carboxylic acid amide, a polymerizable organoalkoxysilane condensate, and at least one other polymerizable unsaturated monomer, said condensate being formed by the reaction of an organoalkoxysilane of the formula:

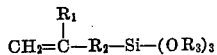

wherein $R_1$ is hydrogen or an alkyl radical, $R_2$ is a divalent organic radical and $R_3$ is an alkyl radical, and an organopolysiloxane of the unit formula:

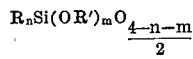

wherein R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5 and the value of $n$ plus $m$ is between 0.51 and 3 wherein said condensate comprises from about 2 percent to about 20 percent of said organoalkoxysilane and from about 80 percent to about 98 percent of said organopolysiloxane.

2. A vehicle for a coating composition comprising an interpolymer of a polymerizable unsaturated carboxylic acid amide, a polymerizable organoalkoxysilane condensate and at least one other polymerizable unsaturated monomer, said condensate being formed by the reaction of (1) an organoalkoxysilane of the formula:

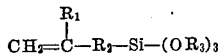

wherein $R_1$ is hydrogen, a methyl radical, an ethyl radical or a propyl radical; $R_2$ is a member selected from the group consisting of alkylene radicals of 1 to 7 carbon atoms and carbonyloxy-containing radicals represented by the formula:

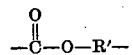

where R' is an alkylene radical of 1 to 6 carbon atoms; and $R_3$ is a methyl or ethyl radical, and (2) an organopolysiloxane of the unit formula:

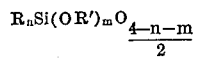

wherein R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is between 0.51 and 3, and at least one other polymerizable unsaturated monomer, and said interpolymer being characterized by containing amide groups having a hydrogen atom replaced by the structure:

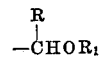

wherein R is selected from the group consisting of hydrogen and hydrocarbon radicals, and $R_1$ is a member selected from the class consisting of hydrogen and a radical derived by removing the hydroxyl group from a monohydric alcohol wherein said condensate comprises from about 2 percent to about 20 percent of said organoalkoxysilane and from about 80 percent to about 98 percent of said organopolysiloxane.

3. The composition of claim 2 wherein the amide interpolymer contains between about 5 percent to about 50 percent by weight of the organoalkoxysilane condensate and between about 2 percent and about 25 percent of the unsaturated carboxylic acid amide monomer, the balance being at least one other polymerizable unsaturated monomer.

4. The composition of claim 2 wherein $R_3$ is a methyl radical.

5. The composition of claim 2 wherein the organoalkoxysilane is α-methacryloxypropyltrimethoxysilane.

6. The composition of claim 2 wherein the organopolysiloxane has the empirical formula:

7. The composition of claim 2 wherein the organopolysiloxane has the empirical formula:

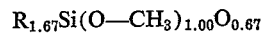

8. The composition of claim 2 wherein at least two of the monomers used in forming the interpolymer are acrylamide and acrylonitrile.

9. A method for producing a vehicle for a coating composition which comprises condensing an unsaturated polymerizable organoalkoxysilane with an organopolysiloxane to form a condensate comprising from about 2 percent to about 20 percent of said organoalkoxysilane and from about 80 percent to about 98 percent of said organopolysiloxane and interpolymerizing the adduct of this condensation reaction with an unsaturated polymerizable carboxylic acid amide and at least one other polymerizable unsaturated monomer, said organopolysiloxane having the unit formula:

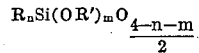

wherein R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5 and the value of $n$ plus $m$ is between 0.51 and 3, and said organoalkoxysilane being represented by the formula:

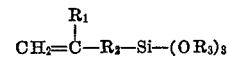

wherein $R_1$ is hydrogen or an alkyl radical, $R_2$ is a divalent organic radical; and $R_3$ is an alkyl radical.

10. A method of producing a vehicle for a coating composition which comprises interpolymerizing the adduct of the condensation reaction of a polymerizable unsaturated organoalkoxysilane and an organopolysiloxane wherein said adduct comprises from about 2 percent to about 20 percent of said organoalkoxysilane and from about 80 percent to about 98 percent of said organopolysiloxane with a polymerizable unsaturated carboxylic acid amide and at least one other polymerizable unsaturated monomer, said organopolysiloxane having the unit formula:

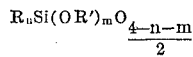

wherein R is a monovalent organic radical bonded to silicon by a carbon-to-silicon bond; R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5 and the value of $n$ plus $m$ is between 0.51 and 3, and said organoalkoxysilane being represented by the formula:

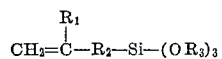

wherein $R_1$ is hydrogen or an alkyl radical, $R_2$ is a divalent organic radical, and $R_3$ is an alkyl radical.

11. An article comprising a metal surface having as a coating thereon a hardened film of the composition of claim 2.

References Cited

UNITED STATES PATENTS 3,261,881  7/1966  Christenson _____ 260—826
3,318,971  5/1967  Chloupek _____ 260—826

MURRAY TILLMAN, Primary Examiner.

P. LIEBERMAN, Assistant Examiner.

U.S. Cl. X.R.

260—826, 827, 72, 46.5, 41; 117—132, 135.1